United States Patent
Adolphson et al.

(10) Patent No.: US 11,615,017 B2
(45) Date of Patent: Mar. 28, 2023

(54) DISCOVERY AND AGGREGATION OF MULTIVARIATE TEST EXPERIMENTS

(71) Applicant: BBY SOLUTIONS, INC., Richfield, MN (US)

(72) Inventors: David Adolphson, Apple Valley, MN (US); Praveen Kotla, Apple Valley, MN (US)

(73) Assignee: BBY SOLUTIONS, INC., Richfield, MN (US)

( * ) Notice: Subject to any disclaimer, the term of this patent is extended or adjusted under 35 U.S.C. 154(b) by 36 days.

(21) Appl. No.: 17/163,356

(22) Filed: Jan. 30, 2021

(65) Prior Publication Data
US 2022/0245059 A1 Aug. 4, 2022

(51) Int. Cl.
G06F 11/36 (2006.01)
H04L 67/60 (2022.01)

(52) U.S. Cl.
CPC ...... *G06F 11/3688* (2013.01); *G06F 11/3684* (2013.01); *G06F 11/3692* (2013.01); *H04L 67/60* (2022.05)

(58) Field of Classification Search
CPC ............. G06F 11/3684; G06F 11/3688; G06F 11/3692; H04L 67/32
See application file for complete search history.

(56) References Cited

U.S. PATENT DOCUMENTS

| 8,296,643 | B1* | 10/2012 | Vasilik | G06F 16/958 |
| | | | | 715/205 |
| 2009/0210863 | A1* | 8/2009 | Vasilik | G06F 8/70 |
| | | | | 717/130 |
| 2014/0278747 | A1 | 9/2014 | Gumm | |
| 2014/0282049 | A1* | 9/2014 | Lyon | G06F 3/0482 |
| | | | | 715/744 |
| 2015/0074650 | A1* | 3/2015 | Bennett | G06F 11/3688 |
| | | | | 717/125 |
| 2016/0124839 | A1* | 5/2016 | Mordo | G06F 11/3664 |
| | | | | 717/124 |

(Continued)

OTHER PUBLICATIONS

J. J. Valdes and A. J. Barton, "Multivariate time series model discovery with similarity-based neuro-fuzzy networks and genetic algorithms," Proceedings of the International Joint Conference on Neural Networks, 2003., 2003, pp. 1945-1950 vol.3, doi: 10.1109/IJCNN.2003.1223705. (Year: 2003).*

(Continued)

*Primary Examiner* — Hanh Thi-Minh Bui
(74) *Attorney, Agent, or Firm* — Schwegman, Lundberg & Woessner, P.A.

(57) ABSTRACT

Systems and techniques for discovery and aggregation of multivariate test experiments are described herein. A web architecture may be polled to discover available multivariate experiments. The multivariate experiments may be aggregated with a set of downstream multivariate experiments that share a dependency with supported functions into a set of aggregated multivariate experiments. A request may be received for a function of a web page. An identifier may be assigned to the request. One or more multivariate experiments may be determined for the function. Edge directives may be created using the sone or more multivariate experiments. The edge directives may be transmitted to a content delivery network.

18 Claims, 5 Drawing Sheets

(56) References Cited

U.S. PATENT DOCUMENTS

2020/0311745 A1* 10/2020 Tu .......................... G06N 7/005

OTHER PUBLICATIONS

Jackel, Chris, "A/B testing at the edge", © 2021 Fastly, Inc. [online]. [retrieved Feb. 19, 2021]. Retrieved from the Internet: <URL: https://www.fastly.com/blog/ab-testing-edge>, (Oct. 25, 2016), 9 pgs.

* cited by examiner

DISCOVERY AND AGGREGATION OF MULTIVARIATE TEST EXPERIMENTS

TECHNICAL FIELD

Embodiments described herein generally relate to multivariate experimentation in web content delivery and, in some embodiments, more specifically to discovery and aggregation of multivariate test experiments.

BACKGROUND

The goal of multivariate testing is to determine whether a current experience or piece of functionality is optimal, or if one or more variations on the current state would be an improvement. On a large web site (e.g., an eCommerce site, etc.) where many teams contribute pieces of the experience or subsets of functionality, there is often a desire to run multiple multivariate tests simultaneously.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Multivariate testing allows web sites to be configured using a variety of variables to experiment with one or more experiences for a user. A number of systems may contribute to building a web page for a device or an application programming interface (API) used by a web page post-render. Each of the systems may have multivariate experiments that are applied to their respective contributions to the web site. The systems and techniques discussed herein allow a web site composed of a number of systems to dynamically participate in multivariate tests that are enabled from a multivariate test management system (e.g., OPTIMIZELY®, etc.).

Figure 1:
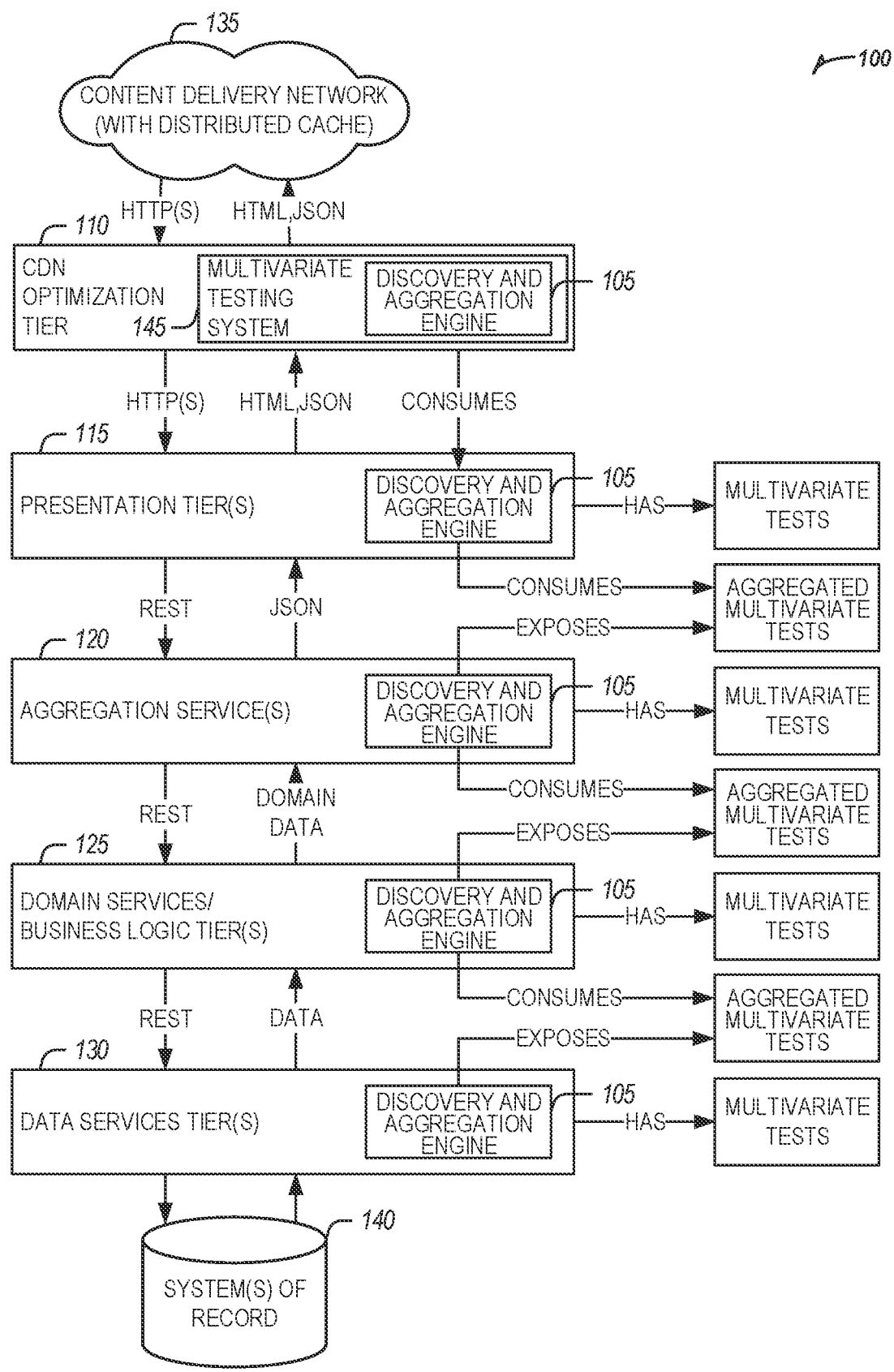
FIG. 1 is a block diagram of an example of a system for discovery and aggregation of multivariate test experiments, according to an embodiment.

FIG. 1 is a block diagram of an example of a system 100 for discovery and aggregation of multivariate test experiments, according to an embodiment.

The system 100 may enable multivariate testing in a large web site architecture composed of many systems of record 140 that contribute functions for the web site. A discovery and aggregation engine 105 includes a software library that may reside on systems among a content delivery network (CDN) optimization tier 110, presentation tier(s) 115, aggregation service(s) 120, domain service/business logic tier(s) 125, data services tier(s) 130, and systems of record 140. The discovery and aggregation engine 105 may advertise the current multivariate tests that a system would like to participate in as well as advertise an aggregation of multivariate tests that other systems from which the system depends upon would like to participate. The software libraries of the discovery and aggregation engine 105 communicate in a manner that parallels the dependency tree of the large website architecture.

The discovery and aggregation engine 105 interfaces with a CDN 135 at the CDN optimization tier 110 via a multivariate testing system (MVTS) 145. The MVTS 145 may assign a random ID to each client device (e.g., stored in a cookie, etc.), fetches user segmentation data or other user data, fetches global multivariate test data (e.g., including test names, segmentation rules, eligibility rules, traffic distribution rules, etc.), feeds the fetched data to a multivariate test bucketing capability (e.g., correctly assigns the user to all active tests), create edge-side include (ESI) directives to store multivariate test assignments for the current user in the CDN 135 for the duration of the request/response processing cycle for a single request from a device of a user.

The system 100 allows new variations of functionality to be created at any tier (e.g., the content delivery network (CDN) optimization tier 110, the presentation tier(s) 115, the aggregation service(s) 120, the domain service/business logic tier(s) 125, and the data services tier(s) 130) in the architecture. The new functions may be enabled via a multivariate test without another system in the dependency graph to make changes to support the execution of the multivariate test. Upon receiving a request for a web page (or data), experiment variations are assigned for the duration of that request/response cycle. In a background task, downstream systems (e.g., systems that are dependencies for fulfilling a request) are polled to discover new experiments. By assigning experiment variations and discovering new experiments, only relevant multivariate test bucket assignment(s) are passed to each endpoint in the architecture that is participating in one or more tests or that depends on another system that is participating in one or more tests. This provides for more efficient cache utilization by preventing unnecessary generation of additional cache keys.

Figure 2:
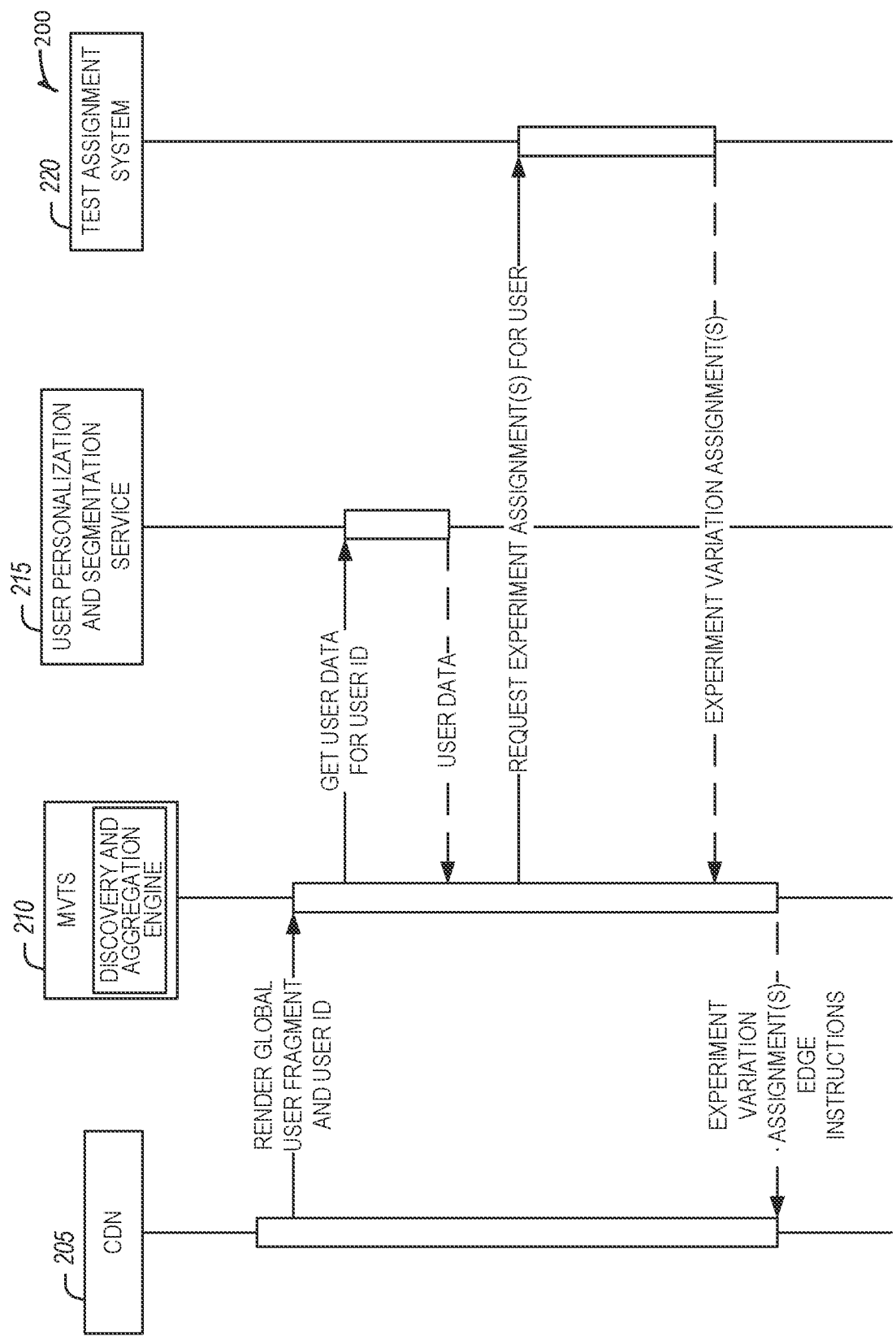
FIG. 2 illustrates a dataflow diagram of an example of experiment variation assignment performed at an origin and translated into edge variables in a fragment based on a current segmentation for a user for discovery and aggregation of multivariate test experiments, according to an embodiment.

FIG. 2 illustrates a dataflow diagram 200 of an example of experiment variation assignment performed at an origin and translated into edge variables in a fragment based on a current segmentation for a user for discovery and aggregation of multivariate test experiments, according to an embodiment. The dataflow diagram 200 may provide features as described in FIG. 1.

A discovery and aggregation engine (e.g., the discovery and aggregation engine 105 as described in FIG. 1) assigns experiment variations in a single ESI fragment called a global user fragment. The result generated from this fragment is ESI logic which includes variable assignments of all active multivariate tests. To calculate these variable assignments, a content delivery network (CDN) 205 passes the current user ID to the MVTS 210. The MVTS 210 makes a hypertext transfer protocol secure (HTTPS) request to a user personalization and segmentation service 215. The user personalization and segmentation service 215 looks up the assigned user segments, attributes, audiences, and propensities for the given user ID. The user personalization and segmentation service 215 passes back this user data to the MVTS 210. The MVTS 210 passes this user data to a test assignment system (TAS) 220. The TAS 220 may be implemented as a stand-alone application or may be a software library running within the MVTS 210 (e.g., a library of the discovery and aggregation engine 105 as described in FIG. 1, etc.). The TAS 220 makes experiment variation assignments based on the user data for all active multivariate tests and returns them to the MVTS 210. The MVTS 210 transforms the experiment variation assignments into edge variables and stores them in the CDN 205 as part of its response to the CDN 205 for the ESI fragment.

Example of Experiment Variation Assignment Edge Instructions:

<esi:assign name="EXPERIMENT_123" value="'X'"/>
<esi:assign name="EXPERIMENT_456" value="'Y'"/>
<esi:assign name="EXPERIMENT_789" value="'Z'"/>

The library deployed in each layer in the architecture keeps track of the relationship between each application programming interface (API) endpoint exposed by its own layer and the API endpoints of downstream services that are a dependency (if any). This is accomplished by exposing data describing each API endpoint and the current multivariate tests and possible experiment variations corresponding to those endpoints at each layer. The endpoint exposed with this information is called the multivariate test metadata (MTM) endpoint.

An example of an MTM request and response body for a given call:

```
HTTP Request URL: http://downstreamserver.webserver.com/mtm
HTTP Response Body:
{
  "endpoints": {
    "/category/content": {
      "tests": [
        {
          "name": "abt606"
        }
      ]
    },
    "/pdp/content": {
      "tests": [
        {
          "name": "experiment123"
        }
      ]
    }
  }
}
```

The response includes two endpoints and their corresponding active experiments.

The library deployed to each layer queries the MTM endpoints of its dependent services. Active multivariate test names are aggregated at each layer such that an endpoint will include all the downstream dependent multivariate tests. This creates an effect in a multilayer architecture where the multivariate tests are pushed up the layers to the MVTS 210.

Other metadata may be gathered and aggregated and used in a similar way. For example:

```
HTTP Request URL:
http://downstreamserver.webserver.com/
endpointGenericMetadata
HTTP Response Body:
{
  "endpoints": {
    "/category/content": {
```

-continued

```
      "inputParamMapping": [
        {
          "enableFooFunction": "user.membershipTier"
        }
      ]
    },
    "/pdp/content": {
      "inputParamMapping": [
        {
          "zipCode": "cookie.zipCode"
        }
      ]
    }
  }
}
```

More generic endpoint metadata allows similar directives to be gathered from downstream systems that modify how the downstream systems endpoints should be called. This may be performed for functions within the architecture other than multivariate testing. For example, a system might want to enable a new feature based on any of the global user data or inputs from a device of a user (e.g., uniform resource locator (URL), cookies, etc.) that may be mapped to a variable reference like user.membershipTier and cookie.zipCode in the example above. The variables are created (or may have already been created) in the CDN 205 for purposes of fine-tuning the multivariate test bucket assignments. After gathering and propagating this more generic endpoint metadata up to the top-level system (e.g., the CDN Optimization Tier 110 as described in FIG. 1), the top-level system is able to call child fragments with these additional parameters in a similar way that it calls the child fragments with the correct experiment assignments.

Figure 3:
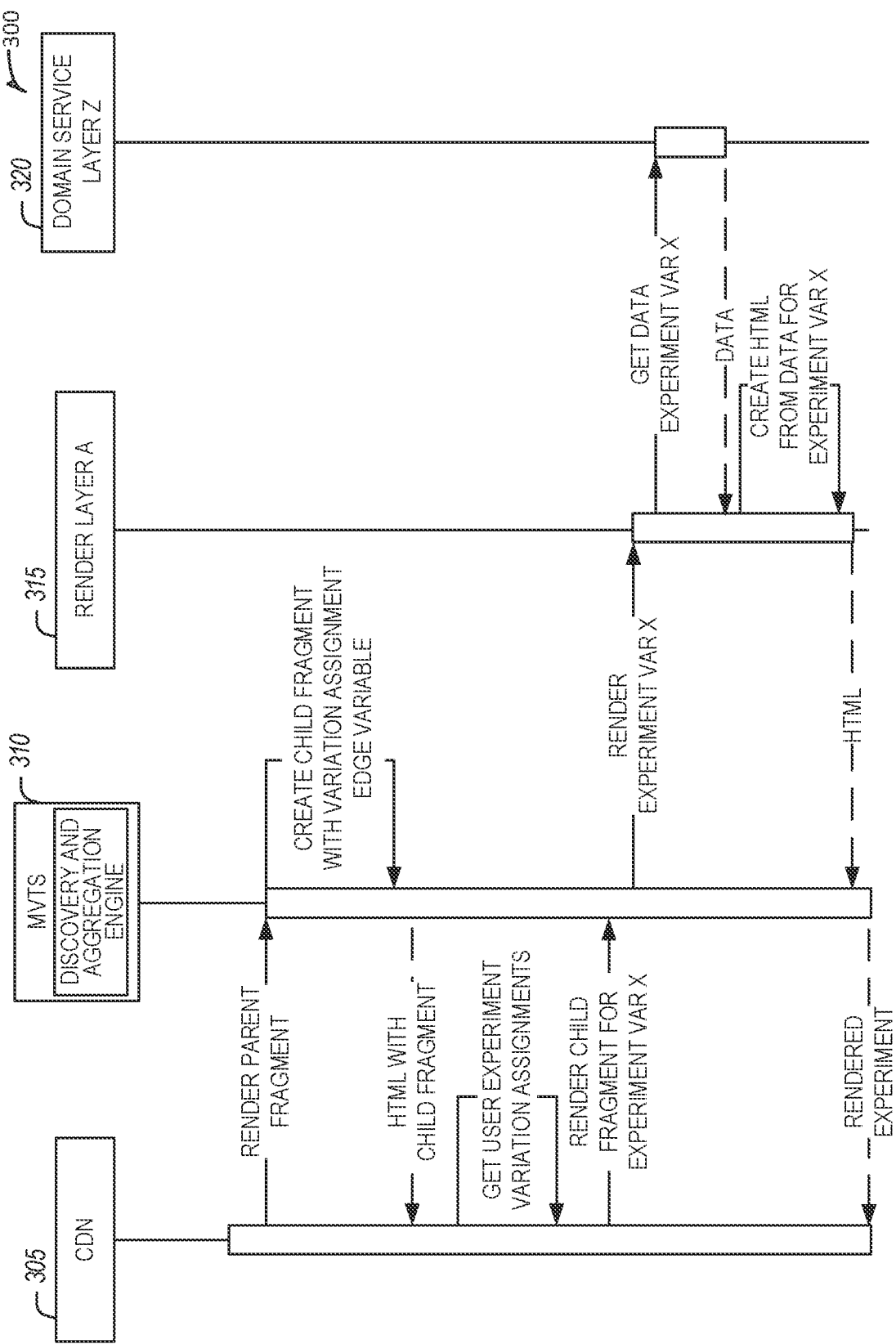
FIG. 3 illustrates a dataflow diagram of an example of fragment creation for discovery and aggregation of multivariate test experiments, according to an embodiment.

FIG. 3 illustrates a dataflow diagram 300 of an example of fragment creation for discovery and aggregation of multivariate test experiments, according to an embodiment. The dataflow diagram 300 may provide features as described in FIGS. 1 and 2.

A MVTS 310 maintains relationships between edge fragments of a web page and downstream server APIs. When multivariate test names corresponding to each downstream API endpoint are available in the MVTS 310, edge fragments are created with corresponding experiment variation assignments included. The edge fragment includes a variable which is resolved in a content delivery network (CDN) 305. The MVTS 310 is passed the correct variable assignment. A downstream render layer A 315 and a domain service layer Z 320 are passed the experiment variation X based on CDN 305 variables assigned. When a child edge fragment is rendered, the variable on the edge fragment is resolved from previous edge instructions.

In an example, parent fragment ("/edge/parent-fragment") may include a child fragment with a variable for "EXPERIMENT_123" included in the child edge fragment URL as shown below:

```
<html>
  <h1>Hello Customer!</h1>
  <esi:include src="edge/child-
fragment?experiment123=$url_encode
($(EXPERIMENT_123|' '))" />
</html>
```

The MVTS 310 may be used across multiple web pages and fragments of a web page to synchronize any number of multivariate tests across a website. The MVTS 310 solves the problem of adding experiment variation assignments on edge fragments dynamically without requiring changes to all layers in a multilayer architecture. This enables any team to implement a testable feature in any layer of the architecture and the libraries automatically integrate the new test into the entire website.

In an example, the systems and techniques discussed herein may be used without a CDN. For example, the MVTS 310 may take over tasks performed by the CDN such as storing multivariate test bucket assignments in local variables, passing the local variables on to downstream systems in a similar manner (e.g., without the callbacks to/from the edge network), and caching responses from downstream systems as necessary.

Figure 4:
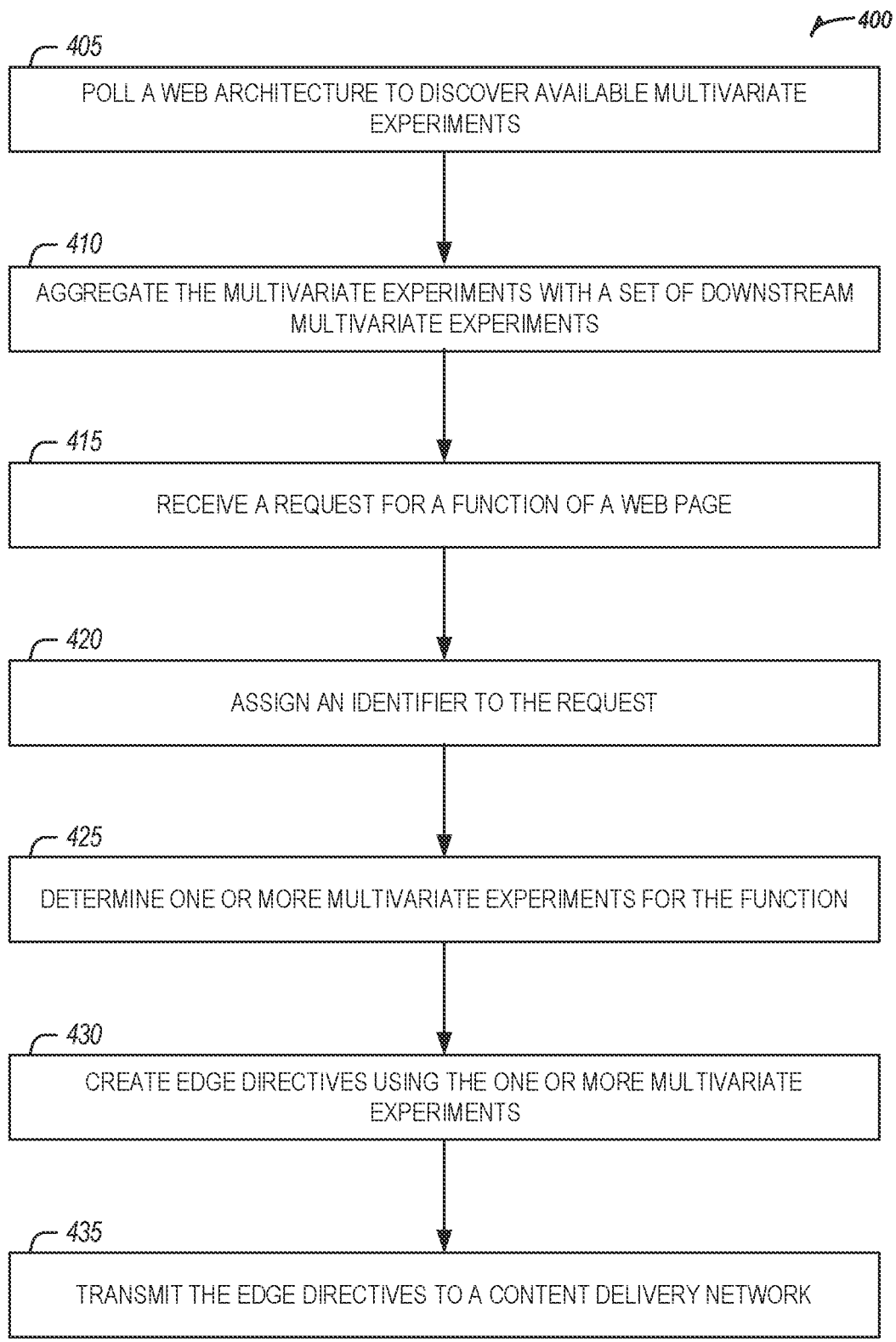
FIG. 4 illustrates an example of a method for discovery and aggregation of multivariate test experiments, according to an embodiment.

FIG. 4 illustrates an example of a method 400 for discovery and aggregation of multivariate test experiments, according to an embodiment. The method 400 may provide features as described in FIGS. 1 to 3.

At operation 405, a web architecture may be polled (e.g., by the discovery and aggregation engine 105 as described in FIG. 1, etc.) to discover available multivariate experiments.

At operation 410, the multivariate experiment may be aggregated (e.g., by the discovery and aggregation engine 105 as described in FIG. 1, etc.) with a set of downstream multivariate experiments that share a dependency with supported functions into a set of aggregated multivariate experiments.

At operation 415, a request may be received for a function of a web page. In an example, the function may be delivered by a server in a presentation tier, a domain services tier, a data services tier, or an aggregation tier of the web architecture.

At operation 420, an identifier may be assigned (e.g., by the MVTS 145 as described in FIG. 1, etc.) to the request. At operation 425, one or more multivariate experiments may be determined (e.g., by the MVTS 145 as described in FIG. 1, etc.) for the function from the set of aggregated multivariate experiments. In an example, multivariate test data may be retrieved, and the one or more multivariate experiments may be determined using the multivariate test data. In an example, the multivariate test data may include a test name, segmentation rules, eligibility rules, or traffic distribution rules. In an example, a user segment may be determined for a user associated with the request and the multivariate experiment bucket assignment may be determined using the user segment.

At operation 430, edge directives (e.g., edge-side includes, etc.) may be created (e.g., by the MVTS 145 as described in FIG. 1, etc.) using the one or more multivariate experiments. At operation 435, the edge directives may be transmitted (e.g., by the MVTS 145 as described in FIG. 1, etc.) to a content delivery network. In an example, it may be determined that the function is a child fragment of a parent fragment. The multivariate experiment may be assigned to the child fragment. Child edge directives may be generated for the child fragment and the child edge directives may be transmitted to the content delivery network. In an example, a render request may be received from the content delivery network for the child fragment assigned the multivariate experiment and a response may be transmitted to the content delivery network that includes the child fragment rendered with data for the multivariate experiment.

Figure 5:
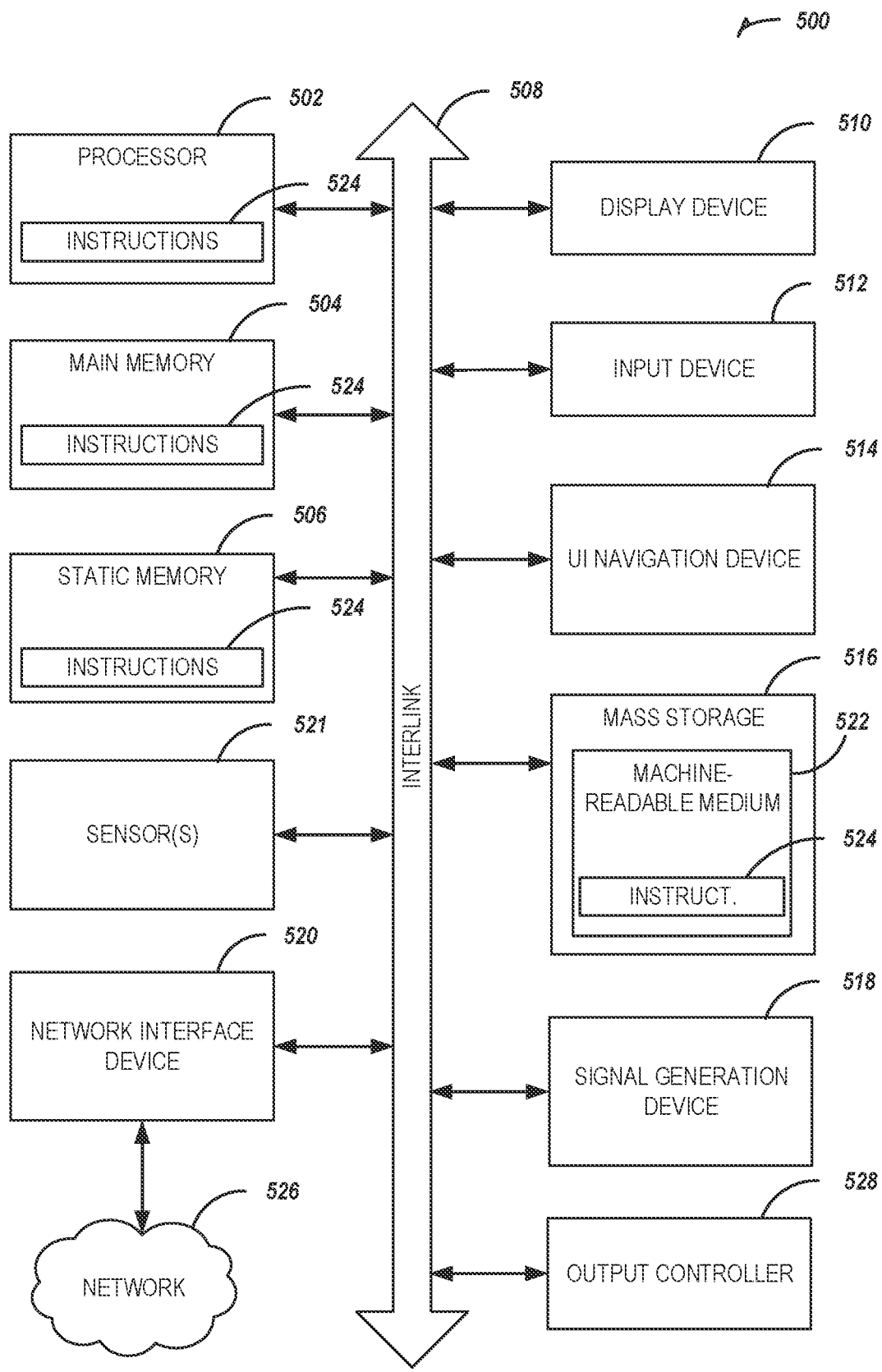
FIG. 5 is a block diagram illustrating an example of a machine upon which one or more embodiments may be implemented.

FIG. 5 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensors. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. In an example, machine readable media may exclude transitory propagating signals (e.g., non-transitory machine-readable storage media). Specific examples of non-transitory machine-readable storage media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, etc.), IEEE 802.15.4 family of standards, peer-to-peer (P2P) networks, $3^{rd}$ Generation Partnership Project (3GPP) standards for 4G and 5G wireless communication including: 3GPP Long-Term evolution (LTE) family of standards, 3GPP LTE Advanced family of standards, 3GPP LTE Advanced Pro family of standards, 3GPP New Radio (NR) family of standards, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

Additional Notes & Examples

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for multivariate experiment discovery and aggregation comprising:
   at least one processor; and
   memory including instructions that, when executed by the at least one processor, cause the at least one processor to perform operations to:
      poll a web architecture to discover available multivariate experiments;

aggregate one or more multivariate experiments with a set of downstream multivariate experiments that share a dependency with supported functions into a set of aggregated multivariate experiments, wherein the dependency provides a service for execution of the supported functions;
receive a request for a function of a web page;
assign an identifier to the request;
identify one or more multivariate experiments for the function from the set of aggregated multivariate experiments;
determine that the function is a child fragment of a parent fragment;
assign the identified one or more multivariate experiments to the child fragment;
create edge directives using the identified one or more multivariate experiments;
generate child edge directives for the child fragment; and
transmit the edge directives and the child edge directives to a content delivery network.

2. The system of claim 1, wherein the function is delivered by a server in a presentation tier, a domain services tier, a data services tier, a content delivery network optimization tier, or an aggregation tier of the web architecture.

3. The system of claim 1, the memory further comprising instructions that, when executed by the at least one processor, cause the at least one processor to perform operations to:
retrieve multivariate test data, wherein the identified one or more multivariate experiments are identified using the multivariate test data.

4. The system of claim 3, wherein the multivariate test data includes a test name, segmentation rules, eligibility rules, or traffic distribution rules.

5. The system of claim 1, the memory further comprising instructions that, when executed by the at least one processor, cause the at least one processor to perform operations to:
determine a user segment for a user associated with the request, wherein a multivariate experiment bucket assignment is determined using the user segment.

6. The system of claim 1, the memory further comprising instructions that, when executed by the at least one processor, cause the at least one processor to perform operations to:
receive a render request from the content delivery network for the child fragment assigned. the identified one or more multivariate experiments; and
transmit a response to the content delivery network including the child fragment rendered with data for the identified one or more multivariate experiments.

7. At least one non-transitory machine-readable medium including for multivariate experiment discovery and aggregation that, when executed by at least one processor, cause the at least one processor to perform operations to:
poll a web architecture to discover available multivariate experiments;
aggregate one or more multivariate experiments with a set of downstream multivariate experiments that share a dependency with supported functions into a set of aggregated multivariate experiments, wherein the dependency provides a service for execution of supported functions;
receive a request for a function of a web page;
assign an identifier to the request;
identify one or more multivariate experiments for the function from the set of aggregated multivariate experiments;
determine that the function is a child fragment of a parent fragment:
assign the identified one or more multivariate experiments to the child fragment;
create edge directives using the identified one or more multivariate experiments;
generate child edge directives for the child fragment; and
transmit the edge directives and the child edge directives to a content delivery network.

8. The at least one non-transitory machine-readable medium of claim 7, wherein the function is delivered by a server in a presentation tier, a domain services tier, a data services tier, a content delivery network optimization tier, or an aggregation tier of the web architecture.

9. The at least one non-transitory machine-readable medium of claim 7, further comprising instructions that, when executed by the at least one processor, cause the at least one processor to perform operations to:
retrieve multivariate test data, wherein the identified one or more multivariate experiments are identified using the multivariate test data.

10. The at least one non-transitory machine-readable medium of claim 9, wherein the multivariate test data includes a test name, segmentation rules, eligibility rules, or traffic distribution rules.

11. The at least one non-transitory machine-readable medium of claim 7, further comprising instructions that, when executed by the at least one processor, cause the at least one processor to perform operations to:
determine a user segment for a user associated with the request, wherein a multivariate experiment bucket assignment is determined using the user segment.

12. The at least one non-transitory machine-readable medium of claim 7, further comprising instructions that, when executed by the at least one processor, cause the at least one processor to perform operations to:
receive a render request from the content delivery network for the child fragment assigned. the identified one or more multivariate experiments; and
transmit a response to the content delivery network including the child fragment rendered with data for the identified one or more multivariate experiments.

13. method for multivariate experiment discovery and aggregation comprising:
polling a web architecture to discover available multivariate experiments;
aggregating one or more multivariate experiments with a set of downstream multivariate experiments that share a dependency with supported functions into a set of aggregated multivariate experiments, wherein the dependency provides a service for execution of supported functions;
receiving a request for a function of a web page;
assigning an identifier to the request;
identifying one or more multivariate experiments for the function from the set of aggregated multivariate experiments;
determining that the function is a child fragment of a parent fragment;
assigning the identified one or more multivariate experiments to the child fragment;
creating edge directives using the identified one or more multivariate experiments;
generating child edge directives for the child fragment; and
transmitting the edge directives and the child edge directives to a content delivery network.

14. The method of claim 13, wherein the function is delivered by a server in a presentation tier, a domain services tier, a data services tier, a content delivery network optimization tier, or an aggregation tier of the web architecture.

15. The method of claim 13, further comprising:
retrieving multivariate test data, wherein the identified one or more multivariate experiments are identified using the multivariate test data.

16. The method of claim 15, wherein the multivariate test data includes a test name, segmentation rules, eligibility rules, or traffic distribution rules.

17. The method of claim 13, further comprising:
determining a user segment for a user associated with the request, wherein a multivariate experiment bucket assignment is determined using the user segment.

18. The method of claim 13, further comprising:
receiving a render request from the content delivery network for the child fragment assigned the identified one or more multivariate experiments; and
transmitting a response to the content delivery network including the child fragment rendered with data for the identified one or more multivariate experiments.

* * * * *

UNITED STATES PATENT AND TRADEMARK OFFICE
CERTIFICATE OF CORRECTION

| | |
|---|---|
| PATENT NO. | : 11,615,017 B2 |
| APPLICATION NO. | : 17/163356 |
| DATED | : March 28, 2023 |
| INVENTOR(S) | : Adolphson et al. |

It is certified that error appears in the above-identified patent and that said Letters Patent is hereby corrected as shown below:

In the Claims

In Column 9, Line 46, in Claim 6, delete "assigned." and insert --assigned-- therefor In Column 10, Line 38, in Claim 12, delete "assigned." and insert --assigned-- therefor In Column 10, Line 43, in Claim 13, before "method", insert --A--

Signed and Sealed this
Twenty-third Day of May, 2023

*Katherine Kelly Vidal*

Katherine Kelly Vidal
*Director of the United States Patent and Trademark Office*